(12) United States Patent (10) Patent No.: US 11,606,209 B2
Mawdsley et al. (45) Date of Patent: Mar. 14, 2023

(54) BLOCKCHAIN BASED ACCESS CONTROL USING TIME-DEPENDENT OBFUSCATION OF ACCESS TOKENS

(71) Applicant: LOCKULAR LIMITED, Kendal (GB)

(72) Inventors: Gary Mawdsley, Manchester (GB); Dmitry Tishkovsky, Manchester (GB)

(73) Assignee: LOCKULAR LIMITED, Kendal (GB)

( * ) Notice: Subject to any disclaimer, the term of this patent is extended or adjusted under 35 U.S.C. 154(b) by 21 days.

(21) Appl. No.: 17/054,285

(22) PCT Filed: Jun. 5, 2019

(86) PCT No.: PCT/GB2019/051562
§ 371 (c)(1),
(2) Date: Nov. 10, 2020

(87) PCT Pub. No.: WO2019/234426
PCT Pub. Date: Dec. 12, 2019

(65) Prior Publication Data
US 2021/0075616 A1 Mar. 11, 2021

(30) Foreign Application Priority Data
Jun. 5, 2018 (GB) .................................. 1809225

(51) Int. Cl.
*H04L 9/32* (2006.01)
*G06F 21/60* (2013.01)

(52) U.S. Cl.
CPC .......... *H04L 9/3213* (2013.01); *G06F 21/602* (2013.01); *H04L 9/3297* (2013.01)

(58) Field of Classification Search
CPC .... H04L 9/3213; H04L 9/3297; G06F 21/602
See application file for complete search history.

(56) References Cited

U.S. PATENT DOCUMENTS 9,646,172 B1 * 5/2017 Hahn .................... G06F 21/602
9,674,194 B1 * 6/2017 McClintock ............ H04L 63/12
(Continued)

FOREIGN PATENT DOCUMENTS

CN 107016611 A 8/2017
CN 107070938 A 8/2017

OTHER PUBLICATIONS

Article 29 Data Protection Working Party, Opinion May 2014 on Anonymisation Techniques, Adopted on Apr. 10, 2014, 37 pages.
(Continued)

*Primary Examiner* — Theodore C Parsons
*Assistant Examiner* — Alan Lingqian Kong
(74) *Attorney, Agent, or Firm* — Barnes & Thornburg LLP

(57) ABSTRACT

There is provided a computer-implemented method for managing third-party access to data, to increase data security and/or privacy. The method comprises receiving, from a third-party computer, a request to access data, wherein the request is indicative of at least one requested operation. A validity of each of the requested operations is determined in dependence on permission data stored in a distributed public ledger. The permissions data defines, for said third-party computer, a set of permissible operations and one or more permissible data attributes associated with each of the set of permissible operations. The request and the validity are logged in the distributed public ledger. For each of the requested operations, if the requested operation is valid, there is created, on the public ledger, an electronic token enabling the third-Valid party computer to obtain access to one or more of the permissible data attributes associated with the requested operation, wherein the electronic token comprises information indicative of a location of the data attributes. A time-dependent transformation is applied to an element of the electronic token, and the electronic token is
(Continued)

communicated from the public ledger to the third-party computer.

15 Claims, 7 Drawing Sheets

(56) References Cited

U.S. PATENT DOCUMENTS

| | | | |
|---|---|---|---|
| 2012/0246115 A1* | 9/2012 | King | G06F 16/1787 707/626 |
| 2013/0191884 A1* | 7/2013 | Leicher | H04L 63/08 726/4 |
| 2013/0208893 A1* | 8/2013 | Shablygin | H04L 9/3234 380/277 |
| 2015/0100788 A1 | 4/2015 | Chastain et al. | |
| 2016/0283939 A1 | 9/2016 | Finlow-Bates | |
| 2017/0034217 A1* | 2/2017 | Anton | G06F 16/2219 |
| 2017/0054726 A1* | 2/2017 | Friedmann | G06Q 30/0283 |
| 2017/0140375 A1 | 5/2017 | Kunstel | |
| 2018/0060496 A1* | 3/2018 | Bulleit | H04L 9/3268 |
| 2018/0173589 A1* | 6/2018 | Chang | G06F 21/6218 |
| 2018/0288031 A1* | 10/2018 | Kumar | H04L 63/0807 |
| 2019/0294822 A1* | 9/2019 | Hennebert | H04L 9/3213 |

OTHER PUBLICATIONS

The International Search Report and the Written Opinion for related PCT/GB2019/051562, dated Jul. 22, 2019, 15 pages.

Search Report for related GB1809225.4, dated Dec. 21, 2018, 3 pages.

\* cited by examiner

BLOCKCHAIN BASED ACCESS CONTROL USING TIME-DEPENDENT OBFUSCATION OF ACCESS TOKENS

CROSS-REFERENCE TO RELATED APPLICATIONS

This application is a U.S. national stage entry of PCT International Patent Application No. PCT/GB2019/051562, filed Jun. 5, 2019, which claims priority to Great Britain Patent Application No. 1809225.4, filed Jun. 5, 2018, the entire disclosures of which are incorporated herein by reference.

BACKGROUND

It is increasingly desired to control access to data, for example to increase data security and/or privacy. Once given access to data it is difficult to limit said access. It is desired to afford more control of third party access to data to the data owner, in addition to transparency surrounding how and when said data is being used.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

STATEMENTS OF INVENTION

Figure 1:
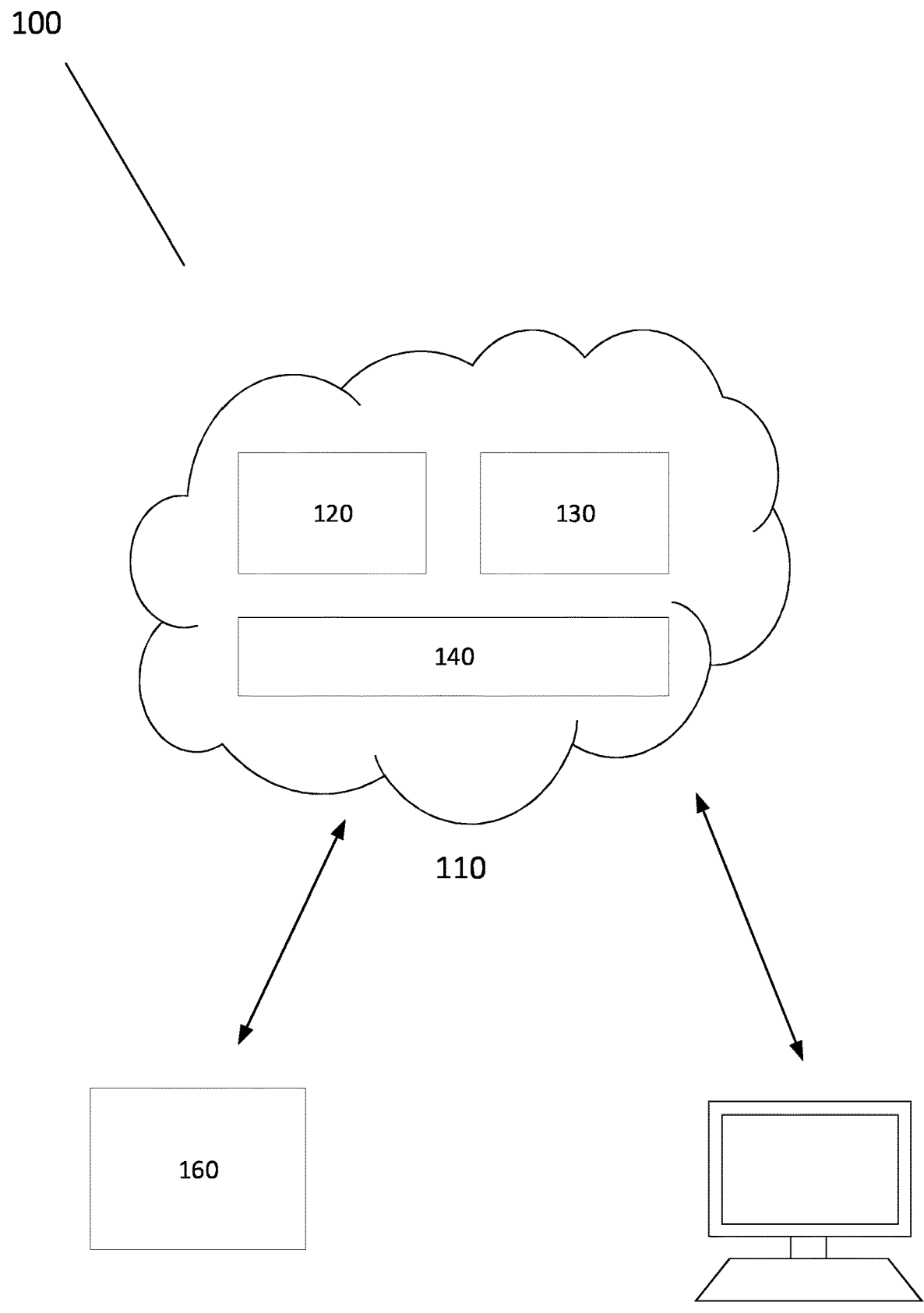
FIG. 1 shows a schematic illustration according to an embodiment of the invention.

According to aspects of the present invention there are provided methods and apparatus as set forth in the appended claims. Aspects of the invention provide methods for managing access to data.

According to an aspect of the invention, there is a computer-implemented method for managing access to data, comprising applying a first time-dependent transformation to the data to produce transformed data. A reversibility of the transformed data may be dependent on the time since the time-dependent transformation was applied. Optionally, the transformed data is communicated to an entity requesting access to the data.

Optionally, the first time-dependent transformation may be determined by software executing on a distributed public ledger.

Optionally, determining the first time-dependent transformation comprises determining a start of a time window. The first time-dependent transformation is reversible during time window. The time window is a period of time during which the first transformation may be reversed.

A second time-dependent transformation is optionally communicated to an entity requesting the data. The second time-dependent transformation may be determined by a third-party computing apparatus. The second time-dependent transformation may be determined by a distributed public ledger.

Optionally, determining the second time-dependent transformation comprises determining a size or duration of the time window.

An indication of a predetermined time window may be stored on the distributed public ledger. If the predetermined time window has not lapsed, the second time-dependent transformation may be selected to be complementary to the first time-dependent transformation. Optionally, the second time-dependent transformation may be selected to be the inverse of the first time-dependent transformation. Advantageously, this allows the computer receiving both the transformed data and the second time-dependent transformation to reconstruct the data. Application of the second time-dependent transformation to the transformed data will reconstruct the original data.

Optionally, if the predetermined time window has lapsed, the first time-dependent transformation and the second time-dependent transformation will be discordant. In this way, outside the time window the accurate data will not be reconstructable. Application of the second time-dependent transformation to the transformed data will not retrieve the original data.

An indication of one or more steps of the method being performed may be logged in a distributed public ledger. In this way, access to data will be auditable.

One or both of the first and second time-dependent transformations may be derived from elliptic curve cryptography.

According to another aspect of the invention, the time-dependent transformations are derived from one or more random numbers.

The data may have been subject to one or more additional obfuscation transforms prior to storage. The second time-dependent transformation may then be convolved with other transforms complementary to these obfuscation transforms before being communicated. For example, the second time-dependent transformation may be convolved with an inverse obfuscation transform.

DETAILED DESCRIPTION OF EMBODIMENTS OF THE INVENTION

FIG. 1 illustrates a system 100 for managing data access according to an embodiment of the invention. The system 100 enhances control and security of data, as will be explained. That is, the system 100 is able to technically limit access to data. The limitation may be one or both of limiting data to which access is allowed and a period for which is access is allowed.

The system 100 comprises a computing platform 110. Computing platform 110 comprises a collection of configurable computing hardware, including CPU and GPU cores, memory, persistent storage and network access apparatus that is accessible to third-party users. The computing platform 110 may in preferred embodiments comprise a plurality of server computers located across multiple geographies. The computing platform may be a cloud computing platform 110.

In some embodiments, the computing hardware of computing platform 110 can be utilised by a service provider 120. The service provider 120 may be any organisation or institution, such as a bank, or an individual which wishes to provide a computing service to remote users.

The service provider provides software i.e. computer program code which is, in use, executed on the computing hardware of the cloud computing platform 110.

The computing platform 110 may provide computing hardware to support the service provider 120. The cloud computing platform 110 may, in use, support one or more virtual machines. The term virtual machine may be understood to encompass containers which may share resources of the computing hardware such as an operating system as will be appreciated, or any other virtual entity on which third party software is executable. A number of virtual machines supported on the cloud computing platform 110 may vary according to a demand for the service provided the service provider 120. In some embodiments the computing hardware provided to the service provider 120 by the computing platform 110 may also include persistent data storage 130.

System 100 further comprises a data access engine 140 for managing data access which is arranged to execute on the computing platform 110. In some embodiments, data access engine 140 provides an interface for other software on the computing platform 100 to access or utilise. In other embodiments, data access engine 140 may be arranged to execute as a component part, such as a software module, of the software of the service provider 120. That is, the data access engine 140 may either be a standalone software entity providing an interface to other software executing on the cloud computing platform 110, or may be one or more software modules forming part of software executing on the computing platform 110.

The computing platform 110 is communicable with a client computer 150. The computing platform 110 may be communicably coupled to the client computer via one or more communication networks. The client computer 150 may be a computing device such as a mobile computer. The client computer 150 may be a mobile computing device, e.g. a tablet, laptop or smartphone. The client computer 150 may in some embodiments be operable by a client of the service provider 120, and the service provider 120 may require the use of data associated with a user of client computer 150, henceforth referred to as the client. The data may, for example, include client information such as bank details or other personal information, but the data is not limited in this respect.

System 100 may further comprise an executable permission file. The permission file may be stored accessible to the cloud computing platform 110. The permission file may be executable responsive to commands communicated from the cloud computing platform 110, as will be explained. In some embodiments, the permission file comprises permission data. The permission data is associated with the client. At least a portion of the permission data is associated with the service provider 120. The permission data defines data for which the client gives the service provider 120 permission to access. In some embodiments, the permission data defines one or more operations for which the service provider 120 is provided with permission to access said data.

The permission data may comprise service provider information for associating the permission data with a service provider 120. The service provider information may be a unique ID which uniquely identifies the service provider 120. The permission data may comprise client information for associating the permission data with a client. The client information may be a unique ID which uniquely identifies the client. The service provider information and client information together define the service provider and client to which the permission data relates in some embodiments. One or both of the service provider information and client information may be for example a Blockchain address or any alternative identification data. The client and service provider 120 may each be associated with a plurality of unique IDs which uniquely identify them, and any one of these unique IDs may be used in the permission data.

In some embodiments, the permission data comprises details of or information about at least one permissible operation. The permissible operation is an operation which may be performed with respect to the data. The at least one permissible operation may define, for example, an operation which the service provider 120 may perform using the data, such as obtaining balance information relating to a bank account, although this is only an example. The at least one permissible operation defines at least one operation for which the service provider 120 is allowed to access the data of the client 150. For each of the at least one permissible operations, the permission data may define one or more permissible data attributes corresponding to the permissible operation. The one or more permissible data attributes associated with the permissible operation may define attributes which the service provider 120 requires in order to perform the permissible operation. The one or more permissible data attributes may define, for example, the columns of tabular data, but are not limited in this respect. For example, for the operation 'check balance', the permission data may define the permissible data attribute 'account balance'.

In other embodiments, the permission data may define at least one allowed data attribute. For each of the at least one allowed data attributes the permission data may further define a set of allowable operations.

Optionally, the permission data is encrypted. The encryption may be performed using an encryption protocol which is, for example, elliptic curve cryptography or any other encryption technique.

Example permission data is shown below where the service provider 120 is a bank, and the client is a customer of the bank.

---

Bank address "0x6f5901157ad51c49efb78b09a7b15db061a6781e"
Client address "0xd00fa259431c95b19f886d61f4e7a4afb47b6062"
Permissions –> [Internet Banking, [
    Login–>[Password Hash],
    Balances–>[Account Number, Account Name, Balance, Date],
    Money Movements–>[Account Number, Balance]
    ]

---

In the above example the client information and service provider information are Blockchain addresses of the customer and bank respectively, although it will be appreciated that other types of address may be used.

The permission file may comprise further information indicative of the storage of client data, as will be explained.

In some embodiments, the computing platform 110 is arranged to be communicable with a public ledger 160 substantially independent of computing platform 110. The public ledger 160 is arranged to record data in a verifiable and permanent way. The public ledger may be publicly accessible to allow public verification of data stored in the ledger. Public ledger 160 may be replicated and synchronized across multiple sites, and may, advantageously, have no central administrator or data storage and so lacks a centralized point of vulnerability. Data logged on public ledger 160 assures a significant level of non-repudiation. The public ledger 160 may be one of several known public ledgers in the art, for example a blockchain ledger or a hashgraph ledger, or public ledger 160 may harness any other distributed ledger technology. The information stored on the public ledger may be encrypted or otherwise obfuscated. In this way the information stored on the public ledger is publicly available but not readable.

In some embodiments of the invention, the permission file is recorded in public ledger 160. In this way, the permission data is publicly available and auditable, and any commands communicated for execution by the permission file will likewise be publicly viewable and auditable. In some embodiments of the invention, the client 150 and service provider 120 agree to the contents of the permission file before it is logged in the public ledger 160.

Figure 2:
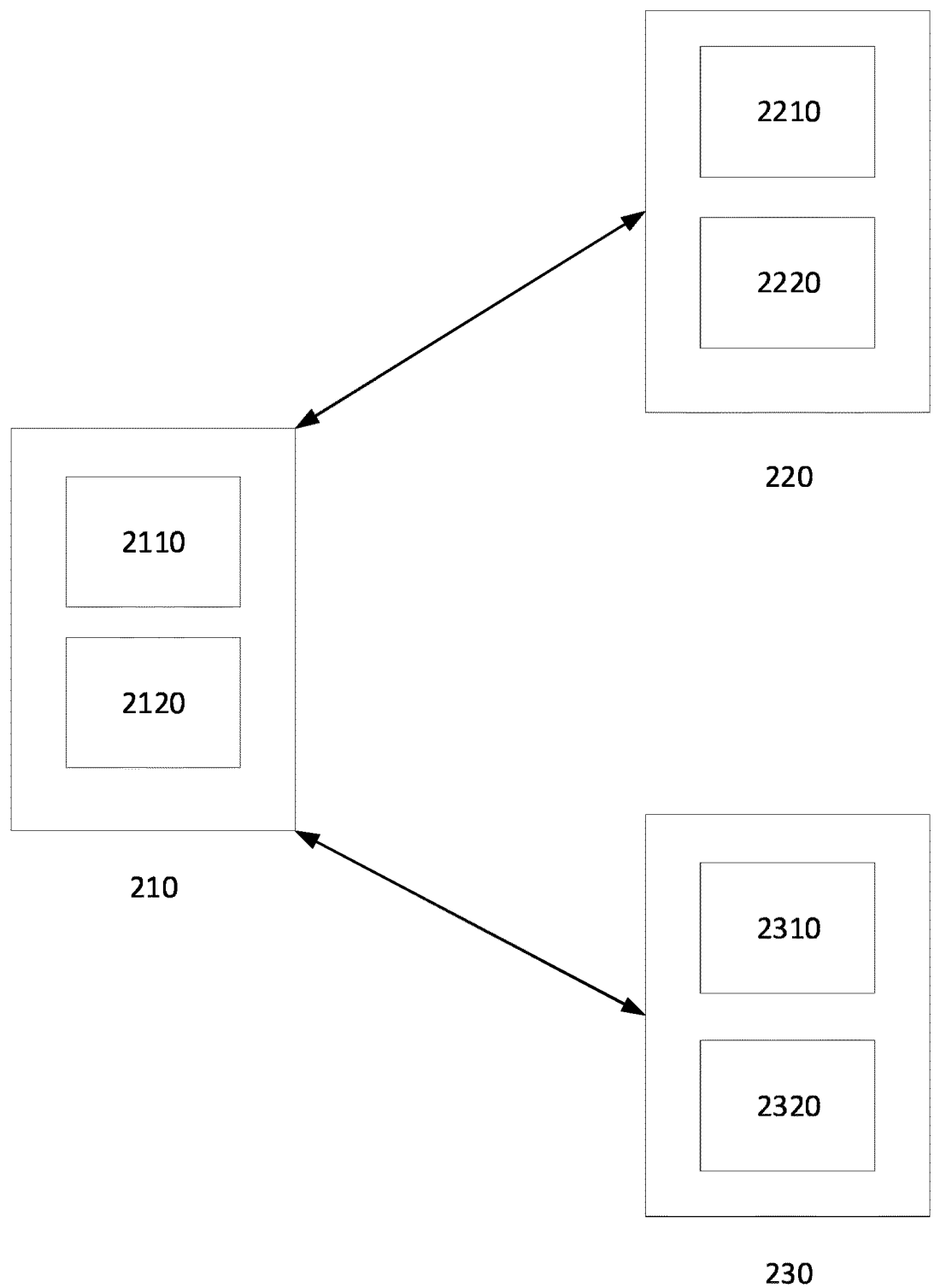
FIG. 2 shows a geographical illustration according to an embodiment of the invention.

FIG. 2 illustrates an example geographical arrangement of the computing platform 110. Computing platform 110 may be arranged i.e. the computing hardware physically distributed over multiple geographical locations. In this example, illustrated are three locations 210, 220 and 230, each comprising a portion of the hardware of computing platform 110.

At each location 210, 220 and 230 a portion of the hardware may be supporting software of the service provider 120. For example, computing resource 2110 at location 210 may be executing software on a virtual machine of service provider 120. However, this virtual machine may also be supported by computing hardware distributed across a plurality of locations. In this embodiment, the software executing on computing resource 2110 utilises data access engine 140, and so an instance 2120 of data access engine 140 is also executed at location 210. Locations 220 and 230 may also comprise instances 2320 and 2220 of data access engine 140, in addition to persistent storage nodes 2210 and 2310 operable to store data therein. Locations 220 and 230 comprising instances 2320, 2220 of data access engine 140 and persistent storage nodes 2210, 2310 may be referred to as storage locations 220, 230. Persistent storage nodes 2210, 2310 may be utilised by service provider 120 amongst other systems running on cloud computing platform 110, and access to the persistent storage nodes may be controlled by data access engine 140. Locations 210, 220 and 230 may be communicably coupled over one or more networks such as the internet.

Figure 3:
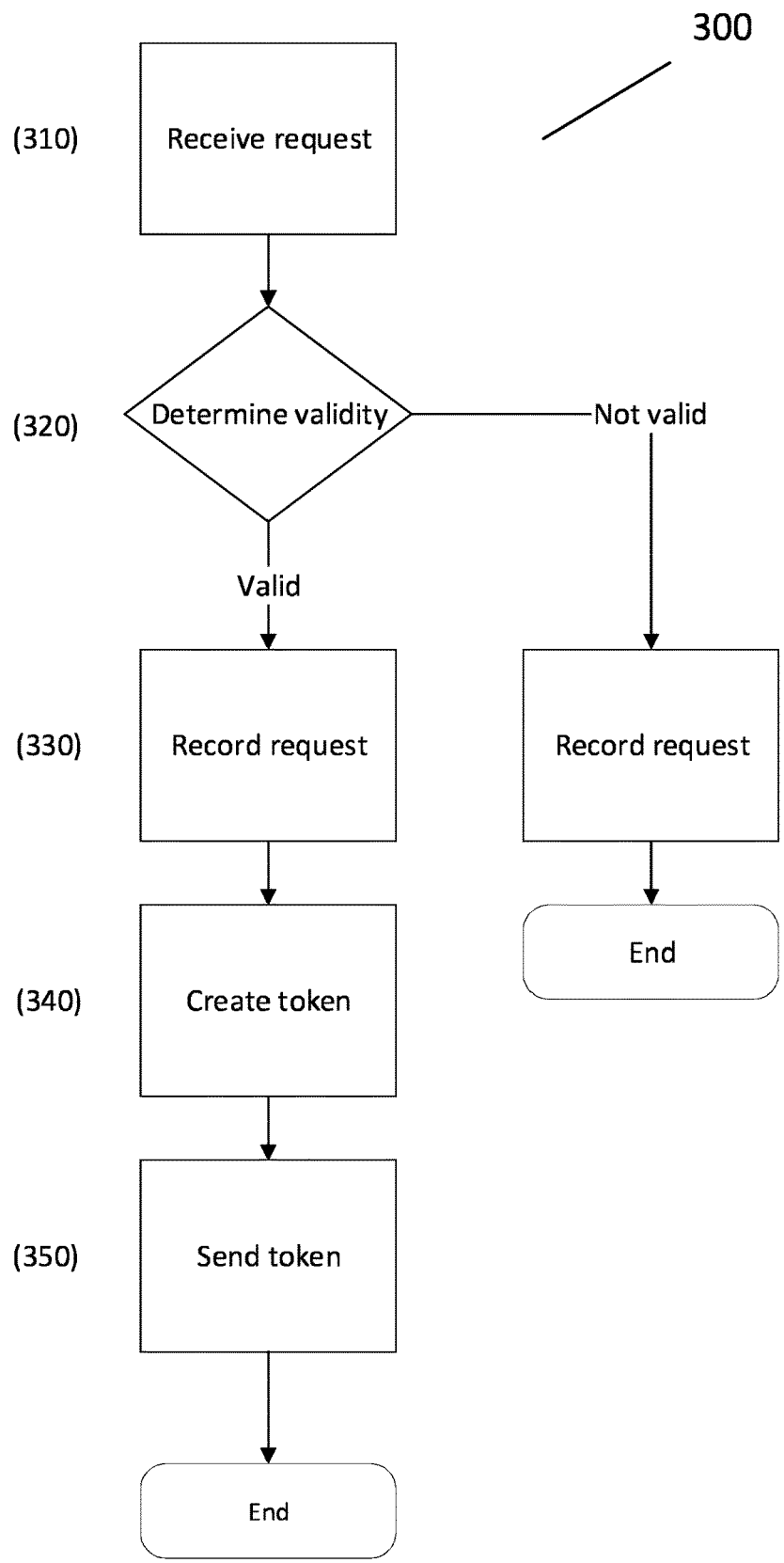
FIG. 3 shows a method according to an embodiment of the invention.

FIG. 3 illustrates a method 300 according to an embodiment of the invention. The method 300 is a computer-implemented method for managing third-party access to data. In some embodiments parts of the method 300 are performed by data access engine 140, and others parts of the method 300 are performed by public ledger 160.

The method 300 comprises a step 310 of receiving a request to access data. The request may be received at data access engine 140 from third-party computing resource, which is in some embodiments service provider 120. The request may originate from another computing resource communicable with service provider 120, for example from client computer 150. In such circumstances the request is first be communicated through a node of the service provider 120. The computing resource may be a server computer, or a personal computer operated by a user, for example a laptop or a mobile phone. The computing resource may also be a virtual machine operating on distributed hardware such as cloud computing platform 110. The request may in some embodiments comprise third-party information for identifying the computing resource from which the request originates. The third-party information may be a unique identifier of the third-party computing resource. For example, if the request comes from service provider 120, the third-party information may be a unique identifier of service provider 120.

The request may further comprise owner information for identifying the owner of the data. The owner information may be a unique owner ID, which uniquely identifies the owner of the data, or a computing resource associated with the owner of the data. For example, if the data relates to a user of client computer 150, the request may further comprise a unique identifier of client computer 150. The unique identifier may, for example, be a Blockchain address, or an IP address amongst other options.

The request may also contain transaction information indicative of a requested operation for which the data is required.

For example, the following request may be received at data engine 140.

Bank address "0x6f5901157ad51c49efb78b09a7b15db061a6781e"
Client address "0xd00fa259431c95b19f886d61f4e7a4afb47b6062"
Transaction -> [Internet Banking, [Balances]]

The method 300 in some embodiments comprises a step 320 of determining the validity of the request received in step 310. As noted above, the request is received at data access engine 140, and comprises the third-party information and the owner information. In step 320, data access engine 140 sends a query to the public ledger 160 to check the existence of a valid permission file containing the third-party information and the owner information.

If a permission file is found on public ledger 160 containing the third-party information and the owner information defining data permissions between the owner and the third-party, then the request may be determined to be valid. If no such permission file is found, the request may be determined to be invalid.

In some embodiments of the invention there may be further checks carried out in step 320 in the determination of the validity of the request.

In some embodiments of method 300, there is a step 330 of recording the request. This step may occur only if the request is determined to be valid in step 320, or may also occur when the request is determined to be invalid. Step 330 comprises recording request information indicative of the request in the public ledger 360. The request information may include some combination of the third-party information, owner information, and transaction information. The information recorded may also include an indication of a time, t1, at which the request was made. Time t1 may, for example, be indicative of the time at which the request was received at data access engine 140, or indicative of the time at which the request is recorded at step 330.

Method 300 comprises a step 340 of creating a token for enabling the third-party computing resource to access the requested data. In some embodiments, step 340 is executing on computing resources of the public ledger 160. Step 340 may be initiated by communicating a command to the executable permission file, wherein the command comprises information indicative of the request received at step 310. The command may then cause the permission file to execute one or more sub-steps of step 340 at the public ledger 160. In some embodiments of the invention, step 340 is only executed if the request is determined to be valid at step 320. One embodiment of step 340 is detailed in FIG. 4.

Figure 4:
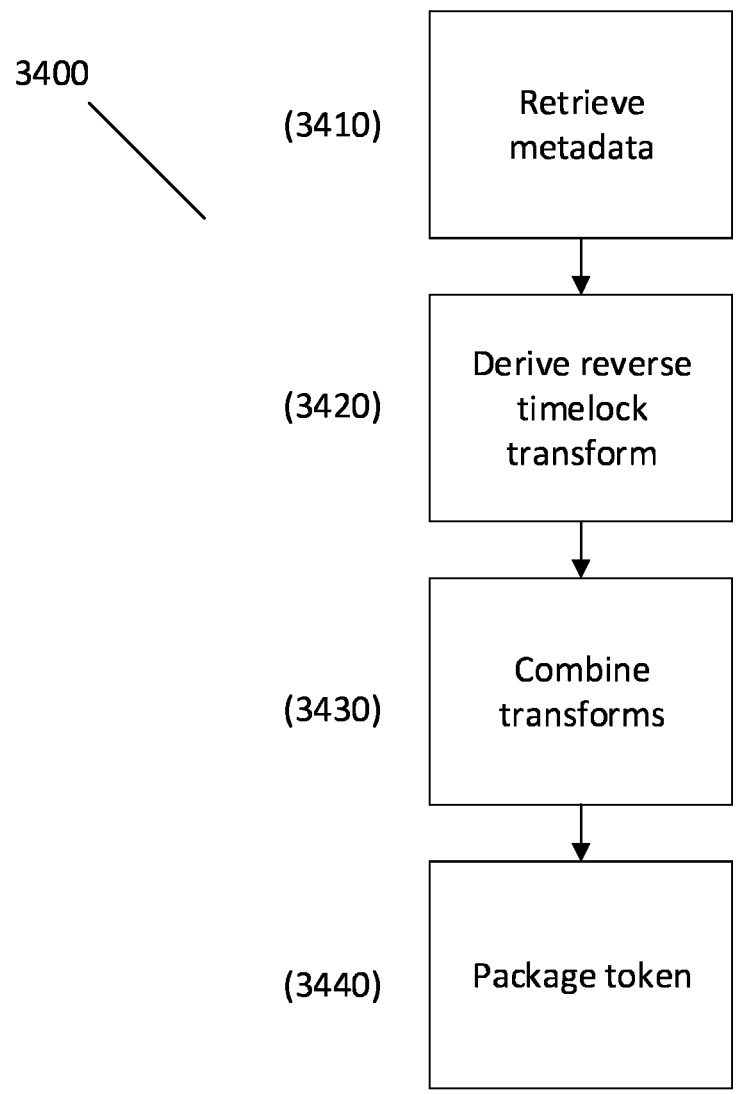
FIG. 4 shows a method according to an embodiment of the invention.

Step 340 may include a sub-step 3410 of retrieving metadata, as illustrated in FIG. 4. The metadata may be stored in the permission file or elsewhere on public ledger 160. The metadata may comprise information indicating the location of the data permissible for the requested operation in step 310. The metadata may comprise information indicative of the storage locations in cloud computing platform 110 of the permissible data. In some embodiments the information indicative of the storage locations may be a URL or other uniform resource identifier, although the information is not limited in this way. There may be a URL corresponding to each piece of permissible data. Alternatively, there may be a URL corresponding to more than one piece of permissible data. There may be more than one URL corresponding to one piece of permissible data, for example if the piece of permissible data has been split and stored in more than one location.

The metadata may further comprise obfuscation information enabling access to the permissible data. The data may have been obfuscated and/or encrypted before being stored by cloud computing platform 110. The metadata may comprise obfuscation information indicative of the obfuscation or encryption applied to the data. The obfuscation information may be a reverse transform, such that application of the reverse transform reverses one or both of the obfuscation and encryption applied to the data. The obfuscation information may comprise a plurality of reverse transforms and information indicative of the order in which they should be applied.

For example, the plaintext value of one piece of permissible data may be simple scalar values [1, 2]. The plaintext data may have been obfuscated by a transform representable by matrix A:

$$\begin{bmatrix} 5 & 2 \\ 2 & 1 \end{bmatrix}$$

Applying the obfuscation matrix A to the piece of permissible data results in the transformed data for storage [9, 4]. The metadata may then comprise obfuscation information indicative of this transform, which may be matrix A, or the inverse transformation A':

$$\begin{bmatrix} 1 & -2 \\ -2 & 5 \end{bmatrix}$$

Applying inverse transformation A' to the stored data will then reconstruct the plaintext values of permissible data [1, 2].

The transformed data [9, 4] may be stored across a plurality of locations 220, 230. For example, value [9] may be stored at location 220 in persistent storage node 2210, and value [4] may be stored at location 230 in persistent storage node 2310.

Step 340 may further comprise a sub-step 3420 of deriving a time-dependent transformation for transforming data in dependence on a time. In some embodiments, the time is t1, the time indicative of the time the request was made in step 310. Step 3420 may therefore comprise retrieving the time t1 from the public ledger 160. Time t1 may be stored on the public ledger 160 with the request information audited at step 330.

Sub-step 3420 may then in some embodiments comprise normalising time t1. Time t1 may be normalised based on any standardised time. For example, time t1 may be converted into the number of seconds since the 1970 epoch, or any other arbitrary date. Sub-step 3420 may comprise a step of computing a time window of time t1. The time window of time t1 may be calculated based on a predetermined window length. The window length may be pre-defined and stored in the permission file. In some embodiments, the window length is used to segment time into a sequence of time windows from a predefined point, for example since the standardised time. The time window of t1 may then be indicative of the number of time windows between the standardised time and t1.

In some embodiments a time-dependent transformation is then derived from the time window of t1. An embodiment of the invention utilises random number generation to derive a time-dependent transformation. In this embodiment, a secure value indicative of the time window of t1 may be used as the seed of a random number generator to produce a transformation. The secure value indicative of the time window of t1 may be determined by encrypting or hashing the value of the time window t1. For example, the secure value may be determined by applying a cryptographic hash function to the time window of t1. The given random number generator may be predefined and stored in the permission file.

For example, the time-dependent transformation may be derived as follows.

time window of $t1 = 50888282$ secure value = hash $(50888282) = 83726155$

Then $RandomNumberGenerator$ $(83726155) = (7, 13, 5, 19)$ $$\Rightarrow \text{Time-dependent transformation} = e = \begin{bmatrix} 7 & 13 \\ 5 & 19 \end{bmatrix}$$

Advantageously, the random number generator derives a series of points that have no obvious correlation in successive time windows. The time dependent transformation may therefore act as a timelock. At a second point in time the same time dependent transformation e may only be derived if the second point in time is within a timelock period. The timelock period may be defined as within the window length following the derivation of the first time-dependent transformation, as will be explained, thereby improving the security of the system.

Step 340 may optionally comprise a sub-step 3430 of combining transformations to create an access transformation. If the obfuscation information obtained in sub-step 3410 comprised a reverse obfuscation transformation to be applied to the data, sub-step 3430 may comprise combining the reverse obfuscation transformation with the time-dependent transformation to create an access transformation. The time-dependent transformation may be applied directly to the reverse obfuscation transformation. Alternatively, a reverse time-dependent transformation may be computed and applied to the reverse obfuscation transformation to create a second access transformation. In some embodiments, both an access transformation and a second access transformation are created.

In some embodiments, the transformations will be representable as invertible operators over integer algebraic structures. In these embodiments, the access transformation may be created by combining the transformations by composition of operators.

Optionally, step 3430 may comprise combining the transformations with a further transformation X derived from a security curve. The security curve may be an elliptic curve, for example $y^2=x^3+x+42$. The further transformation X may be derived from a plurality of points on the security curve, for example a point P and a further point on the curve, T.

For example, the further transformation X may be based on the point $P_0+T$, where the point P is a sum of two points $P=P_0+P_1$.

An access transformation Q may then be defined as:

$$Q_{ij}=a_{ij}\cdot e_j\cdot X$$

Where $a_{ij}$ are the elements of reverse obfuscation transformation A'.

A second access transformation Q' may be computed, with transformation X' based on the point $P_1-T$:

$$Q_{ij}'=a_{ij}\cdot e_j\cdot X'$$

For example, when $$e=\begin{bmatrix}7 & 13\\5 & 19\end{bmatrix}, A'=\begin{bmatrix}1 & -2\\-2 & 5\end{bmatrix},$$

$P_0=(33,35)$, $P_1=(19,30)$, $P=(1,1)$, $T=(24,42)$, then Q and Q' are calculated as follows.

$$Q=\begin{bmatrix}(26,33) & (9,36)\\(29,6) & (21,37)\end{bmatrix}$$

$$Q'=\begin{bmatrix}(27,31) & (18,42)\\(36,6) & (27,12)\end{bmatrix}$$

For example, $Q_{1,1}=1.7(2,3), =(26,33)$; because $a_{1,1}=1$, $e_1=7$ and $P_0+T=X=(2,3)$; order of X is 27; X'=(13,4); order of X' is 18.

Step 340 comprises a sub-step 3440 of packaging the token. In sub-step 3440, the executable permission file causes assembly of the elements of the token. The elements of the token comprise at least some information indicative of the location of the requested data. The information indicative of the location of the requested data may be the information retrieved in step 3410. For example, the information indicative of the requested data may be at least one URL leading to a piece of the data requested.

In some embodiments of the invention, sub-step 3440 comprises constructing access URLs to each piece of data. The access URLs may comprise the location information of the piece of data, which may already be a URL. The access URLs may further comprise one or more of the owner information, third-party information and transaction information received in the request at step 310.

For example, the permission file may package a token as follows. In this case, the requested operation, 'Internet Banking, Balances' was associated with four pieces of permissible data attributes in the permissions data 'Account Number', 'Account Name', 'Balance' and 'Date'. These four attributes are stored across a plurality, such as two, different persistent storage locations. The permissions data assembles a URL for each storage location comprising the client ID, service provider ID, and requested operations. The two URLs are packaged into a token with at least two pieces of obfuscation information: the byte code for reassembling the data, and the access transform used in the byte code. The access transform may be a combination of the reverse obfuscation transform and the derived time-dependent transform. The token may further comprise parameters for the security curve, and a second access transformation. The token may be as shown below:

Data1-url
https://wiredtiger1.blumamba.net/
  0x6f5901157ad51c49efb78b09a7b15db061a6781e,
  0xd00fa259431c95b19f886d61f4e7a4afb47b6062,InternetBanking,Balances Data2-url
https://wiredtiger2.blumamba.net/
  0x6f5901157ad51c49efb78b09a7b15db061a6781e,
  0xd00fa259431c95b19f886d61f4e7a4afb47b6062,InternetBanking,Balances Byte code for algorithm
Security Curve $y^2=x^3+x+42$
Reference Point P with smooth order=(1,1)
Order of P=54

$$\text{Access transform } Q=\begin{bmatrix}(26,33) & (9,36)\\(29,6) & (21,37)\end{bmatrix}$$

$$\text{Second Access transform } Q'=\begin{bmatrix}(27,31) & (18,42)\\(36,6) & (27,12)\end{bmatrix}$$

The (order of P)+1 is representative of how many times the value of P can be added to itself on the security curve before returning to the original point P.

Method 300 comprises a step 350 of communicating the token. The token may be communicated from the public ledger 160 to the service provider 120 who originally sent the request in step 310. The token may be communicated via the data access engine 140.

Figure 5:
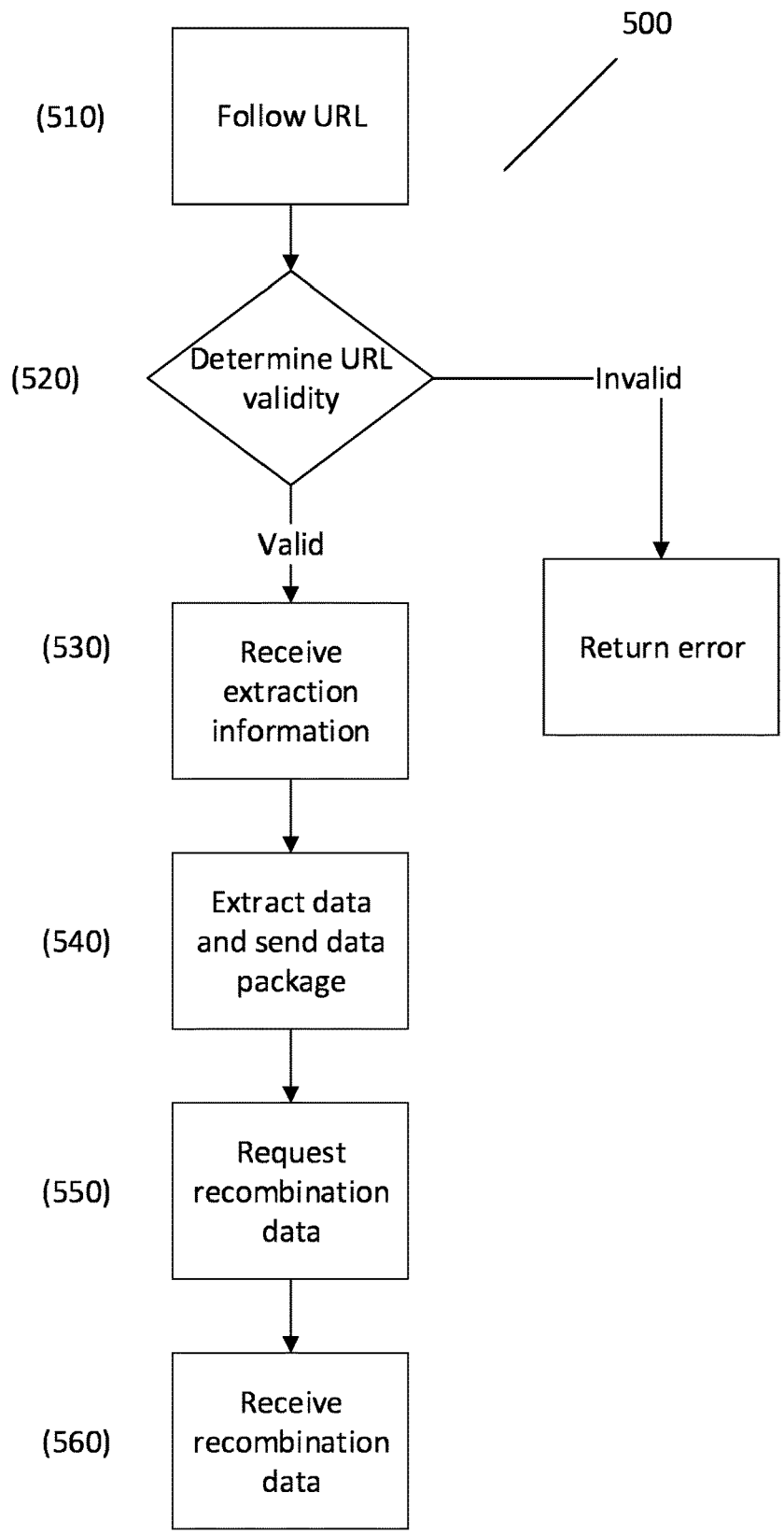
FIG. 5 shows a method according to an embodiment of the invention.

FIG. 5 illustrates a method 500 of accessing data from a token according to an embodiment of the invention. Elements of method 500 may be executed on an instance of data access engine 140, for example instance 2220 or 2320. Elements of method 500 may also be executed on the public ledger 160.

Method 500 comprises a step 510 of following at least one access URL. The access URL may be received in the token at service provider 120. The token sent at step 350 may comprise at least one access URL comprising location information of the data, as described above. Method 510 comprises following at least one of the access URLs to one or more of the locations specified in the access URLs. For example, the access URLs may specify that the permissible data is located in persistent storage nodes 2210, 2310 in locations 220, 230. There may be one URL associated with node 2210 and one URL associated with node 2310. In this case, step 510 may comprise following one or both of the access URLs to one or both of the indicated locations 220, 230. The URLs may indicate the storage node 2210, 2310 or another instance of data access engine 140 running at locations 220, 230. Instances of data access engine 140 running at locations 220, 230 are indicated as 2220, 2320.

Method 500 may comprise in some embodiments a step 520 of determining the validity of the URL in step 510. As noted above, the access URL may contain one or more of the owner information, third-party information and transaction information received in the request at step 310. In step 520, data access engine 140 may send a query to the public ledger 160. The query may log the owner information, third-party information and transaction information in the public ledger 160, check for the existence of permission data between the owner and the third-party, and determine the validity of the URL at least in part thereon. For example, the following owner information, third-party information and transaction information may be contained in the access URL and subsequently recorded in the ledger.

Bank address "0x6f5901157ad51c49efb78b09a7b15db061a6781e"
Client address "0xd00fa259431c95b19f886d61f4e7a4afb47b6062"
Transaction -> [Internet Banking, [Balances]]

In some embodiments, step 520 further comprises determining if a request has been recently recorded on the public ledger 160 comprising the third-party information, owner information and transaction information. This may be checking for the request recorded in step 330.

The validity of the token may be determined in step 520 based on a combination of the existence of permission data and the existence of a recorded request on the public ledger 160 as outlined above.

Method 500 comprises a step 530 of receiving extraction information. The extraction information received in step 530 may be compiled and sent by the permission file executing on the public ledger 160.

Figure 6:
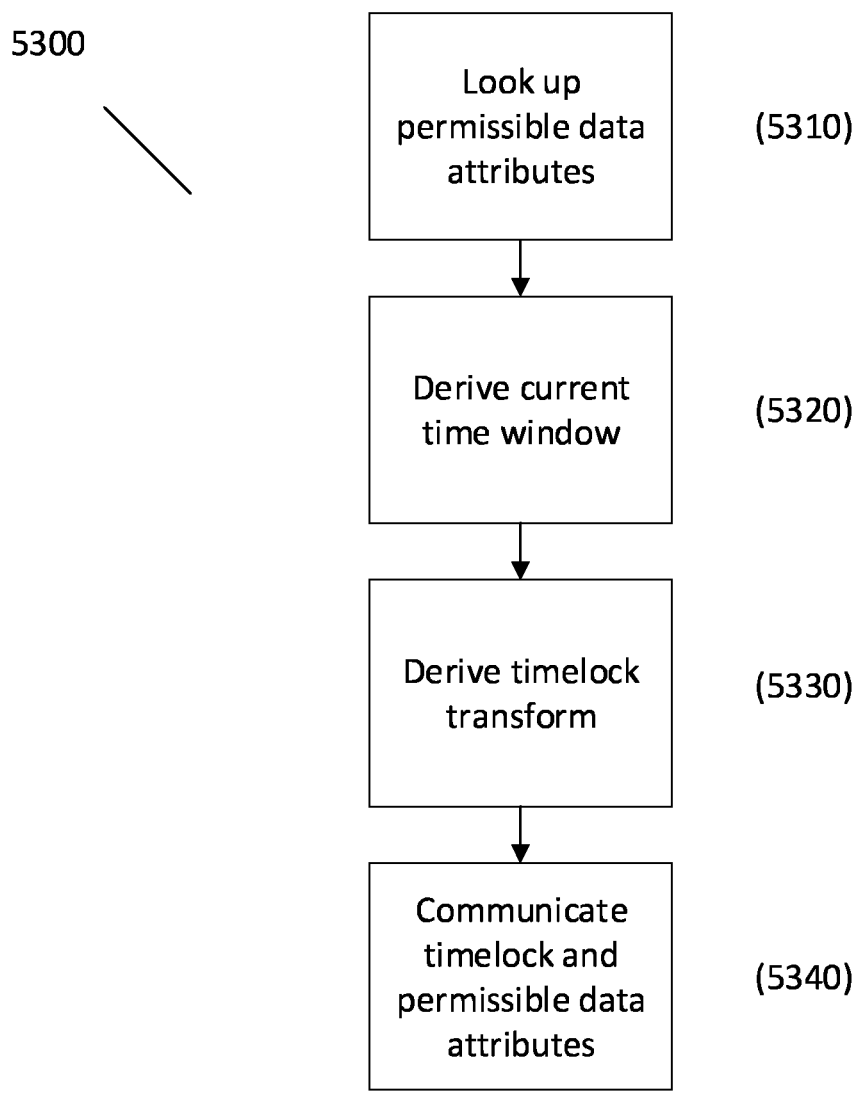
FIG. 6 shows a method according to an embodiment of the invention.

In some embodiments, logging the information from the access URL on the public ledger in step 520 executes a response from the permission file if the URL is determined to be valid. The permission file then compiles extraction information in method 5300 as outlined in FIG. 6. Method 5300 may comprise several sub-steps.

Method 5300 may comprise a sub-step 5310 of looking up the permissible data attributes. The information from the access URL comprises transaction information indicating a requested transaction. Sub-step 5310 may then comprise searching the permission data in the permission file to identify permissible data attributes associated with the requested transaction.

Method 5300 may comprise a sub-step 5320 of deriving the time window of current time t2. Sub-step 5320 may comprise extracting time t1 of the original request from the public ledger 160. The time difference, t2−t1, wherein t2 and t1 have both been normalised e.g. relative to the 1970 epoch may then be calculated. The time difference is indicative of the time difference between the original request as received in step 310 and the time at which the access URL is followed in step 510. The time difference is indicative of whether the timelock defined by the time-dependent transformation e has expired. Sub-step 5320 may then comprise calculating the relative time window of t2 and t1. In calculating the relative time window, there may first be a step of determining if t2−t1 is less than the window length, i.e. if t2 is within the timelock period. The window length may be the same parameter as used in step 3420, and may be stored in the permission file. If t2−t1 is less than the window length, then t2 may be within the timelock period and the relative time window may be determined to be zero. Sub-step 5320 may then comprise determining the time window of t2. The time window of t2 may be determined from t2 directly, or may be determined by combining the time window of t1 with the relative time window. For example, the time window of t2 may be calculated as the sum of the time window of t1 and the relative time window.

For example, the time windows may be calculated as followed.

$t1 = 1526648472$ $t2 = 1526648495$ $t2 - t1 = 23$ seconds window length = 30 seconds Relative time window = floor $(23/30) = 0 \rightarrow t2$ is within timelock period time window of $t1 = $ floor $(1526648472/30) = 50888282$ time window of $t2 = $ time window of $t1 +$ Relative time window
$= 50888282 + 0 = 50888282$ Method 5300 may comprise a sub-step 5330 of deriving a time-dependent transformation from the time window of t2. This transformation may be analogous to the transformation derived in step 3420. An embodiment of the invention utilises a random number generator to derive a time-dependent transformation. In this embodiment, a secure value indicative of the time window of t2 may be used as the seed of a random number generator to produce a transformation. The secure value indicative of the time window of t2 may be determined by encrypting or hashing the value of the time window t2. For example, the secure value may be determined by applying a cryptographic hash function to the time window of t2. In some embodiments, the random number generator and hash function are the same as the random number generator and hash function used to derive the transformation in step 3420. Advantageously, the random number generator derives a series of points that have no obvious correlation in successive time windows. This improves the security of the system, as will be explained.

The invention is not limited in this respect, and any other technique of deriving a series of uncorrelated points from the time window may also be used.

For example, using the time windows calculated above, the following time-dependent transformation may be derived:

time window of t2=50888282
secure value=hash(50888282)=83726155
Then RandomNumberGenerator(83726155)=(7, 13, 5, 19)

This results in time dependent transformation $$e = \begin{bmatrix} 7 & 13 \\ 5 & 19 \end{bmatrix}$$

As the window difference is zero this is the same transformation as would be calculated in step 3420.

If the window difference was 1, and so t2 is outside the timelock period:

time window of t2=50888283
secure value=hash(50888283)=75839927
Then RandomNumberGenerator(75839927)=(5, 19, 6, 1)
This results in time dependent transformation $$e = \begin{bmatrix} 5 & 19 \\ 6 & 1 \end{bmatrix}$$

Sub-step 5330 may further comprise computing a derived transformation d for each piece of permissible data. The derived transformation d may be calculated in dependence on the time-dependent transformation e, the order of reference point X and the order of reference point X'.

For example, using time dependent transformation e above and the order of reference point X as 27 and the order of reference point X' as 18, the derived transformation d may be calculated component-wise such that for each component $e_{i,1}$ of the time-dependent transformation e, $e_{i,1} \cdot d_{i,l}$ mod (order of X)=1, and such that for each component $e_{i,2}$ of the time-dependent transformation e, $e_{i,2} \cdot d_{i,2}$ mod (order of X')=1. This calculation yields a derived transformation:

$$d = \begin{bmatrix} 4 & 7 \\ 11 & 1 \end{bmatrix}$$

The derived transformation d is not limited in this respect, for example other conditions may be used.

A different derived transformation d may be computed for each storage location, or one derived transformation d may be computed and divided across different storage locations. For example, [4 7] may be computed for data to be retrieved from a location 1 and [11 1] may be computed for data to be retrieved from a location 2.

Step 530 may comprise a sub-step 5340 of communicating the derived transformation d derived in step 5330 and the permissible data attributes identified in step 5310. The derived transformation d and permissible data attributes may be communicated from the permission file in the public ledger 160 to an instance of data access engine 140 to which the access URL led in step 510, for example data access engine 2220, 2320. An indication that sub-step 5340 has been performed may be logged on the public ledger 160. Optionally, a different derived transformation d may be sent to each location 2220, 2320. Optionally, the derived transformation d may be divided and different parts communicated to each location 2220, 2320 as described above.

For example, the permission file may communicate the following extraction information to the data access engine 2220, 2320.

$$d = \begin{bmatrix} 4 & 7 \\ 11 & 1 \end{bmatrix}$$

Attributes to be released=[Account Number, Account Name, Balance, Date]

Once the extraction information has been received at the data access engine 2220, 2320 running at the storage nodes in step 530, method 500 comprises a step 540 of extracting and sending the data package.

Step 540 comprises extracting the permissible data. Step 540 may be executed by an instance of data access engine 140, for example instance 2210. The permissible data may be stored in persistent storage node 2220. Step 540 entails determining the permissible data attributes from the extraction information communicated at step 530. Step 540 may comprise identifying the permissible data attributes in the storage node 2210. The permissible data attributes may be, for example, columns of tabular data stored in storage node 2210. Step 540 may then comprise extracting the permissible columns of tabular data.

Step 540 may comprise a step of applying the derived transformation d to the permissible data extracted. If the derived transformation d comprise an operator or vector and the extracted permissible data a matrix or vector, step 5310 may comprise applying the derived transformation d to the data extracted by matrix multiplication.

Step 540 may comprise a step of adding a constant value to the data extracted. The constant value may be manufactured by the public ledger at step 530.

For example, as shown in Appendix A, stored data fragments to be released $m_i$ may be transformed in step 540 as follows:

$$v_i = m_i \cdot d_i + f_i$$

d is the derived transformation from time-dependent transform e, and f is the constant value.

For example, $$d = \begin{bmatrix} 4 & 7 \\ 11 & 1 \end{bmatrix}$$

$$f = \begin{bmatrix} 1 & 3 \\ 2 & 4 \end{bmatrix}$$

$$m = [9 \quad 4]$$

$$v_1 = 9[4 \quad 7] + [1 \quad 3] = [37 \quad 66]$$

$$v_2 = 4[11 \quad 1] + [2 \quad 4] = [46 \quad 8]$$

Step 540 may comprise sending the data package. The data package may comprise the transformed extracted data $v_1$, $v_2$. The data package may be sent from the data access engine 140 to the third-party computing resource from which the request was received at step 310. For example, if the request was received from service provider 120, the data package may be communicated to service provider 120.

Service provider 120 now has received the token comprising the obfuscation information, including two access transformations comprising a reverse obfuscation transform convolved with a reverse time-dependent transformation, received at step 350. The service provider 120 further has received the permissible data for the operation requested, with derived transformation applied, received at step 540.

The method 500 may comprise a step 550 of requesting recombination data R from the public ledger. The request may be communicated from the service provided 120 to the public ledger 160, and may be logged on the public ledger 160. The method 550 may comprise a step 560 of receiving, at the service provider 120, the recombination data R from the public ledger 160. The recombination data R will allow the service provider 120 to reconstruct the data required for the operation requested at step 310.

For example, the recombination data R may comprise a linear combination of elements of access transformations Q and Q' and the constant f, or the recombination data R may just comprise detail of the constant f. An example of using R to reconstruct the requested data at the service provider 120 is detailed in Appendix A.

For example, multiplying the transformed extracted data with Q and Q' yields in the ongoing example two points on the security curve for each value:

$$\text{Value 1-} \begin{matrix} (36,37) \\ (28,7) \end{matrix}$$

-continued

Value 2- (6,7)
(18,42)

For each value the two points may be added together:

Value 1-(28, 36)

Value 2-(29, 37)

The recombination data R received from the public ledger may comprise the compensating point on the security curve for each value, representative of the constant values f:

$$R = \begin{matrix}(39,24)\\(36,6)\end{matrix}$$

Now adding the corresponding point of R to each value, we arrive at (1,1) for value 1 and (2, 40) for value 2. Application of the Pohlig-Hellman algorithm allows arrival at the original requested data [1,2] since 1.(1,1)=(1,1) and 2.(1,1)=(2,40).

Aspects of the present invention provide a method for securely managing access to data stored by the computing platform 110, for example when requested by the service provider 120, as has been described with reference to FIGS. 3 to 6. According to method 300 and method 600, a number of steps involve communication between components of the system 100 to ensure that only validly requested data is securely retrieved.

Figure 7:
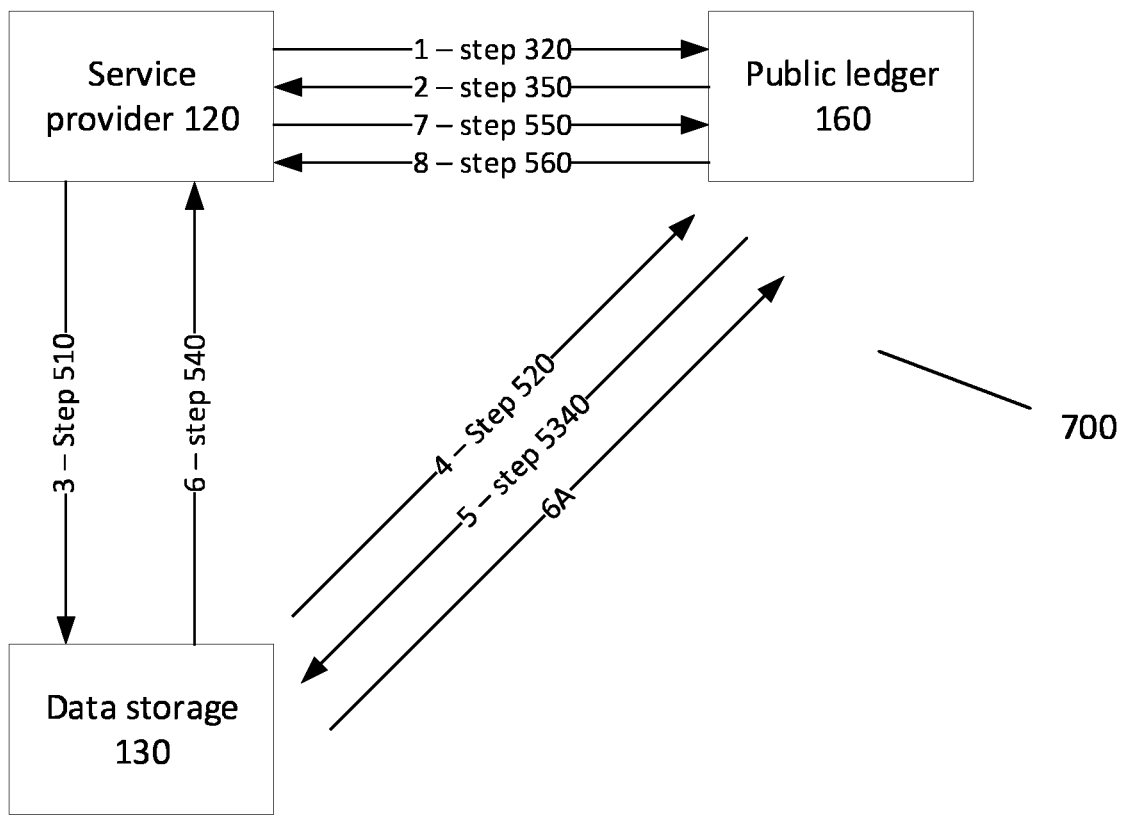
FIG. 7 shows a communications flow diagram according to an embodiment of the invention.

A communications flow diagram 700 of the multi-entity system 100 according to an embodiment of the present invention is illustrated in FIG. 7. The communications flow diagram 700 shows an ordered visualisation of communications between different entities of the system 100 during a subset of steps of method 300 and method 600. The communications flow diagram 700 further illustrates one or more optional communication steps that may be included in method 300 or method 600 to further improve security of the system.

A number of the communications labelled on FIG. 7 have been described with reference to FIGS. 3 to 6 and so a detailed description of each step will be omitted. The ordering labelled is illustrative and the invention is not limited thereto. For example, one or more of the communications illustrated in FIG. 7 may be performed concurrently or in a different order.

1. Step 310, 320—service provider 120 sends request for data via data access engine 140. Data access engine 140 queries public ledger 160 for existence of valid permission file.
2. Step 350—public ledger 160 communicates token to service provider 120 including access URLs, access transform Q and second access transform Q'.
3. Step 510—service provider 120 follows access URL to communicate request for data release to storage locations 220, 230.
4. Step 520—data access engine 140 at storage locations 220, 230 communicates query to public ledger 160 to determine validity of access URL.
5. Step 5340—public ledger 160 communicates the derived transformation d and permissible attributes to data access engine 140 at storage locations 220, 230
6. Step 540—data access engine 140 at storage locations 220, 230 sends transformed extracted data $v_1$, $v_2$ to service provider 120.
7. Step 550—service provider 120 requests recombination data R from public ledger 160.
8. Step 560—public ledger 160 communicates recombination data R to service provider 120.

Figure 7A:
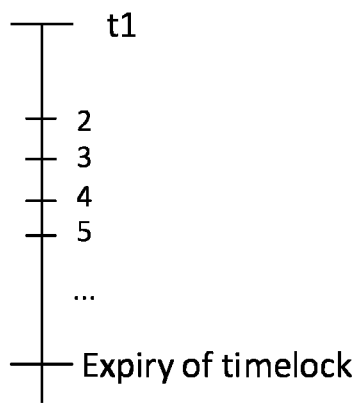
FIG. 7A shows a timeline illustration according to an embodiment of the invention.

As has been described, the token communicated at step 350 is timelocked. A timeline illustrating the timelock period is shown in FIG. 7A. The start of the timelock period t1 is indicative of the request for data being received. As illustrated on FIG. 7A, at least a number of the illustrated communications 2, 3, 4, 5 . . . must be completed within a time window beginning at t1, otherwise the transformed extracted data $v_1$, $v_2$ will not align with the access transforms in the token and the original data will not be able to be reconstructed. In some embodiments, all communications 2, 3, 4, 5, 6, 7 and 8 must be performed within the timelock period. As has been described, an indication of steps 2, 5 and 8 may each be logged on the public ledger.

To further improve the security of the system 100, one or more additional security steps may be implemented within method 300 or method 500.

In some embodiments an additional communication 6A may be performed between the storage locations 220, 230 and the public ledger 160 as illustrated in FIG. 7. The communication 6A may be performed concurrently or subsequently to communication 6, i.e. step 540, during method 500. The communication 6A may be indicative of the transformed extracted data $v_1$, $v_2$ having been sent to the service provider 120. The communication 6A may comprise the transformed extracted data $v_1$, $v_2$. An indication of the communication 6A may be logged on the public ledger 160. The indication logged on the public ledger 160 may indicate that the communication 6A has occurred, but not comprise the contents of the communication 6A, for example the transformed extracted data $v_1$, $v_2$ may not be logged on the public ledger 160. However the transformed extracted data $v_1$, $v_2$ may otherwise be utilised by the public ledger 160, as will be explained.

In some embodiments the public ledger 160 may be configured to only perform communication 8, i.e. step 560 of method 500, if an indication of communication 6A has been logged on the public ledger 160. Advantageously, this may improve security of the system as the public ledger 160 must receive confirmation both from the service provider 120 (in the form of communication 7) and the storage locations 220, 230 (in the form of communication 6A) before releasing the recombination data R, which is the last piece required for the original data to be reconstructed.

In some embodiments, the access transformation Q may be distorted with randomly generated values g to further improve the security of the system 100. That is, in step 340 may comprise defining the access transformation Q as:

$$Q_{ij} = (a_{ij} \cdot e_j + g_j) \cdot X$$

The access transformation Q contained in communication 2 (i.e. transmitted in step 350) may then be distorted, as defined above.

The recombination data R contained in communication 8 (i.e. communicated by the public ledger in step 560) may then be correspondingly adjusted to account for the distortion to the access transformation Q. For example, if the access transformation Q is distorted as above, the recombination data R may comprise values:

$$R_i = -(f_i'Q_{i1}' + \ldots + f_n'Q_{in}') - (a_{i1}e_1f_1 + \ldots + a_{in}e_nf_n + g_1v_1 + \ldots + g_nv_n)X$$

Advantageously, the recombination data R may require the transformed extracted data vi, v2 and so may not be determined before communication 6A has been completed. In this way, it is ensured that the public ledger 160 only releases the recombination data R in communication 8 once confirmation has been received both from the service provider 120 (in the form of communication 7) and the storage locations 220, 230 (in the form of communication 6A). An example of defining Q and R in this way is contained in Appendix A.

It will be appreciated that while embodiments have been describe with reference to receiving a request to access a piece of data in the form of reading data, analogous steps may also be implemented for writing data. That is, a request may be received from a service provider 120 to write data to a storage location 220, 230. It will be appreciated by the skilled person that analogous steps may be performed to those described with reference to method 300 and method 500. An example of writing data in this way is contained in Appendix A.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

APPENDIX

1 The Schema

1.1 Reading Data

Starting point. An integer invertible matrix A is encoded in Public Ledger and never released to anyone. Let n be the dimension of A. The original data vector $\overline{m}$ of length n is transformed by A to $\overline{m}'$:

$$\overline{m}' = A\overline{m}$$

and distributed over n frades. Let $$A^{-1} = \begin{pmatrix} a_{11} & \cdots & a_{1n} \\ \vdots & & \vdots \\ a_{n1} & \cdots & a_{nn} \end{pmatrix}.$$

Public Ledger. Public Ledger chooses an elliptic curve $E(F_p)$ over a field $F_p$ of a characteristic p. PL chooses two points P and T on the curve such that P has a smooth order #P and T is cryptographically strong. In particular, #T is comparable with the rank of the curve and not a smooth integer.

PL represents the point P as a sum of two points $P = P_0 + P_1$ and calculates $X = P_0 + T$ and $X' = P_1 - T$. It is required that X and X' are cryptographically strong.

PL generates random vectors $\overline{e}$ and $\overline{f}$ of the length n and derives a vector $\overline{d}$ which components are inverses of corresponding components of $\overline{e}$ modulo #P:

$$d_i \cdot e_i = 1 \bmod \#X$$

Similarly, PL obtains random vectors $\overline{e}'$, $\overline{f}'$ and the vector $\overline{d}'$ such that $d_i' \cdot e_i' = 1 \bmod \#X'$.

PL calculates a matrices Q and Q' of points on the curve:

$$Q_{ij} = a_{ij} \cdot e_j \cdot X$$

$$Q_{ij}' = a_{ij} \cdot e_j' \cdot X'$$

and a vector R of points on the curve $R = -(Q\overline{f} + Q'\overline{f}')$:

$$R_i = -(f_1 \cdot Q_{i1} + \ldots + f_n \cdot Q_{in} + f_1' \cdot Q_{i1}' + \ldots + f_n' \cdot Q_{in}')$$

PL sends $Q_1$, Q' and R to the client and values $d_i$, $f_i$, $d_i'$, $f_i'$ to each frade $i = 1, \ldots, n$.

Frades. Each frade $i = 1, \ldots, n$ calculates values $v_i$ and $v_i'$:

$$v_i = m_i' \cdot d_i + f_i$$

$$v_i' = m_i' \cdot d_i + f_i'$$

It sends $v_i$ and $v_i'$ to the client.

Client. Client arranges $v_i$ and $v_i'$ received from all the frades in vectors: $\overline{v} = (v_1, \ldots, v_n)^t$ and $\overline{v}' = (v_1', \ldots, v_n')^t$ and calculates $Q\overline{v} + Q'\overline{v}' + R$.

The result is $\overline{m}P$:

$$\begin{aligned}
& v_1 Q_{i1} + \ldots + v_n Q_{in} + v_1' Q_{i1}' + \ldots + v_n' Q_{in}' + R_i = (m_1' \\
& d_1 + f_1) Q_{i1} + \ldots + (m_n' d_n + f_n) Q_{in} + (m_1' d_1' + f_1') \\
& Q_{i1}' + \ldots + (m_n' d_n' + f_n') Q_{in}' + R_i = m_1' d_1 \\
& Q_{i1} + \ldots + m_n' d_n Q_{in} + \ldots + m_n' d_n' Q_{in}' + (f_1 \cdot \\
& Q_{i1} + \ldots + f_n \cdot Q_{in} + f_1' \cdot Q_{i1}' + \ldots + f_n' \cdot Q_{in}') + \\
& R_i = m_1' d_1 Q_{i1} + \ldots + m_n' d_n Q_{in} + m_1' d_1' \\
& Q_{i1}' + \ldots + m_n' d_n' Q_{in}' = m_1' d_1 a_{i1} e_1 X + \ldots + m_n' \\
& d_n a_{in} e_n X + m_1' d_1' a_{i1} e_1' \\
& X' + \ldots + m_n' d_n' a_{in} e_n' X' = m_1' a_{i1} \\
& X + \ldots + m_n' a_{in} X + m_1' a_{i1} X' + \ldots + \\
& m_n' a_{in} X' = m_i X = m_i (X + X') = m_i (P_0 + T + P_1 - T) = m_i (P_0 + P_1) = m_i P
\end{aligned}$$

Since the order of P is smooth integer, the Pohlig-Hellman algorithm allows efficiently solve discrete logarithm over P revealing the original data $\overline{m}$.

2 Variants of Attacks on Reading Schema 2.1 Attack on $A^{-1}$

Subattack on $d_i$, $f_i$ or $d_i'$, $f_i'$. An attacker is able potentially recover numbers either $d_i$, $f_i$ or $d_i'$, $f_i'$, or both pairs. The most probable developments of the attack are:

Pass special values to the algorithms with the aim to recover components $A^{-1}$.

For example, the attacker can pass the vectors $(d_1+f_1, 0, \ldots, 0)^t$ and $(d_1'+f_1', 0, \ldots, 0)^t$ to the algorithm. In this case, the output is $(a_{11}, \ldots, a_{n1})^t \cdot P$ and all $a_{11}, \ldots, a_{n1}$ can be recovered.

Countermeasures. Standard cryptography level on top of the schema. Logging requests from the client and frades. Limited life-time of all the parameters supplied to frades and the client. ECC strong distortion of the vector R and additional loggable request of the client for the antidote.

The distortion can be tied to frade data permitting the (time-locked and single-execution) algorithm provided to the client to be applied only to the specific frade data. For example, the matrix Q can be distorted with a randomly generated values $g_j$:

$$Q_{ij}=(a_{ij}e_j+g_j)X$$

As long as frades communicate values $v_i$ to the client, they log the values to the public ledger. The ledger releases adjusted values of $R_i$ on request from the client:

$$R_i=-(f_1'Q_{i1}'+ \ldots +f_n'Q_{in}')-(a_{i1}e_1f_1+ \ldots +a_{in}e_nf_n+g_1v_1+ \ldots +g_nv_n)X$$

Knowing the order of the point P recover values $e_i$ or/and $e_i'$.

Writing Data

Cell values $a_{ij}$ of the direct transformation matrix A is stored at Pulic Ledger. The real data $\overline{m}=(m_1, \ldots, m_n)^t$ are to be written to each frade i as an i-th coordinate of the transformed vector $\overline{m}'=A\overline{m}$.

1. Client sends a request to Public Ledger for permission to write $\overline{m}$.
2. Public Ledger creates a timelock and, based on the timelock, chooses an elliptic curve, a 'weak' point P and a 'strong' point T. It generates the following values:
   (a) given a random representation of P as $P=P_0+P_1$, $X=P_0+T$ and $X'=P_1-T$;
   (b) random $e_i$, $e_i'$, $k_i$, $g_{ij}$ for i, j=1, . . . , n;
   (c) $d_i=e_i^{-1}$ mod #X, $d_i'=e_i'^{-1}$ mod #X', $l_i=k_i^{-1}$ mod #X;
   (d) $Q_{ij}=(a_{ij}e_j+g_{ij})X$, $Q_{ij}'=a_{ij}-g_{ij}k_iX$;
3. Public Ledger sends the matrices Q, Q' and G to Client.
4. Client calculates $V=Q\overline{m}$, $V'=Q'\overline{m}'$ and $U=G\overline{m}$.
5. Client sends $V_i$, $V_i'$ to each Frade i and returns U to Public Ledger.
6. Public Ledger prepares values $F_i=-d_ik_iU_i$
7. Each Frade i, once received $V_i$ and $V_i'$, requests and receives from Public Ledger values $d_i$, $d_i'$, $l_i$ and $F_i$.
8. Frade i calculates $W_i=d_iV_i+d_i'V_i'+l_iF_i$ and solves discrete logarithm problem $t_i \cdot P=W_i$ with the Pohlig-Hellman algorithm. The following verifies that $t_i=m_i'=\Sigma_{j=0}^n a_{ij}m_j$:

$$W_i = d_iV_i + d_i'V_i' + l_iF_i = d_i(Q\overline{m})_i + d_i'(Q'\overline{m}')_i - l_id_ik_iU_i =$$

$$d_i\sum_{j=0}^n (a_{ij}e_j + g_{ij})m_jX + d_i'\sum_{j=0}^n a_{ij}e_j'm_jX' - d_iU_i =$$

$$\sum_{j=0}^n a_{ij}m_jX + d_i\sum_{j=0}^n g_{ij}m_jX + \sum_{j=0}^n a_{ij}m_jX' - d_iU_i =$$

$$m_i'X + d_i(G\overline{m})_i + m_i'X' - d_iU_i = m_i'(X + X') = m_i'P$$

The invention claimed is:

1. A computer-implemented method for managing third-party access to data, comprising:
   receiving, from a third-party computer, a request to access data, wherein the request is indicative of at least one requested operation;
   determining a validity of each of the at least one requested operations indicated in the request in dependence on permission data stored in a distributed public ledger, wherein said permissions data defines, for said third-party computer, a plurality of permissible operations and one or more permissible data attributes associated with each of the plurality of permissible operations, wherein each of the plurality of permissible operations is an operation which may be performed using the data;
   logging the request and the validity in the distributed public ledger;
   for each of the at least one requested operations, if the requested operation is valid, creating, on the public ledger, an electronic token enabling the third-party computer to obtain access to one or more of the permissible data attributes associated with the requested operation, wherein the electronic token comprises a reverse obfuscation transformation for reversing obfuscation applied to the data attributes and at least one URL indicative of a location of the obfuscated data attributes;
   applying a time-dependent transformation to the reverse obfuscation transformation to create an access transformation;
   communicating the electronic token from the public ledger to the third-party computer;
   following the at least one URL to the location of the obfuscated permissible data attributes;
   sending, to the distributed public ledger from the location of the obfuscated permissible data attributes, a query to determine the validity of the URL, wherein determining the validity of the URL comprises checking whether the request was logged in the distributed public ledger;
   logging information contained in the URL in the distributed public ledger; and
   if the URL is determined to be valid:
     selecting, at the public ledger, a further time-dependent transformation;
     communicating the further time-dependent transformation to the location of the obfuscated permissible data attribute;
     applying the further time-dependent transformation to the obfuscated permissible data attribute; and
     returning the obfuscated permissible data attribute to the third-party computer.

2. The method of claim 1, wherein determining the validity of each of the at least one requested operations comprises determining if each of the at least one requested operations is a permissible operation.

3. The method of claim 1, further comprising a step of logging the permission data in the distributed public ledger.

4. The method of claim 1, further comprising a step of logging the electronic token in the distributed public ledger.

5. The method of claim 1, wherein the distributed public ledger provides nonrepudiation of the request and the validity.

6. The method of claim 1, wherein the distributed public ledger is a blockchain.

7. The method of claim 1, further comprising a step of communicating the request to a host of the data.

8. The method of claim 1, wherein the URL further comprises an ID of the third-party computer and an ID of an owner of the data.

9. The method of claim 1, comprising a step of selecting the time-dependent transformation, which step comprises starting a time window, wherein the electronic token is not sufficient to enable access to the permissible data after the time window lapses.

10. The method of claim 9, wherein the step of selecting a further time-dependent transformation comprises determining if the time window has lapsed and selecting the further time-dependent transformation in dependence thereon.

11. The method of claim 10, wherein, if the time window has not lapsed, the further time-dependent transformation is selected to be the inverse of the time-dependent transformation applied to the element of the electronic token.

12. The method of claim 1, wherein:
the data requested is in at least a first fragment and a second fragment, wherein the first and second fragments are stored separately; and
creating the electronic token comprises including in the electronic token information corresponding to the locations of the first and second fragments.

13. The method of claim 12, further comprising the step of retrieving transformation information corresponding to the fragments of data, and wherein creating the electronic token comprises including the transformation information in the electronic token; and optionally wherein the time-dependent transformation is applied to the transformation information.

14. A computing apparatus comprising a memory and one or more processors, wherein the memory comprises computer readable code which, when executed by the one or more processors, is arranged to perform a method, the method comprising the steps of:
receiving, from a third-party computer, a request to access data, wherein the request is indicative of at least one requested operation;
determining a validity of each of the at least one requested operations indicated in the request in dependence on permission data stored in a distributed public ledger, wherein said permissions data defines, for said third-party computer, a plurality of permissible operations and one or more permissible data attributes associated with each of the plurality of permissible operations, wherein each of the plurality of permissible operations is an operation which may be performed using the data;
logging the request and the validity in the distributed public ledger;
for each of the at least one requested operations, if the requested operation is valid, creating, on the public ledger, an electronic token enabling the third-party computer to obtain access to one or more of the permissible data attributes associated with the requested operation, wherein the electronic token comprises a reverse obfuscation transformation for reversing obfuscation applied to the data attributes and at least one URL indicative of a location of the obfuscated data attributes;
applying a time-dependent transformation to the reverse obfuscation transformation to create an access transformation;
communicating the electronic token from the public ledger to the third-party computer;
following the at least one URL to the location of the obfuscated permissible data attributes;
sending, to the distributed public ledger from the location of the obfuscated permissible data attributes, a query to determine the validity of the URL, wherein determining the validity of the URL comprises checking whether the request was logged in the distributed public ledger;
logging information contained in the URL in the distributed public ledger; and
if the URL is determined to be valid:
selecting, at the public ledger, a further time-dependent transformation;
communicating the further time-dependent transformation to the location of the obfuscated permissible data attribute;
applying the further time-dependent transformation to the obfuscated permissible data attribute; and
returning the obfuscated permissible data attribute to the third-party computer.

15. A non-transitory computer-readable data storage medium storing computer-readable instructions which, when executed by one or more processors, perform a method comprising steps of:
receiving, from a third-party computer, a request to access data, wherein the request is indicative of at least one requested operation;
determining a validity of each of the at least one requested operations indicated in the request in dependence on permission data stored in a distributed public ledger, wherein said permissions data defines, for said third-party computer, a plurality of permissible operations and one or more permissible data attributes associated with each of the plurality of permissible operations, wherein each of the plurality of permissible operations is an operation which may be performed using the data;
logging the request and the validity in the distributed public ledger;
for each of the at least one requested operations, if the requested operation is valid, creating, on the public ledger, an electronic token enabling the third-party computer to obtain access to one or more of the permissible data attributes associated with the requested operation, wherein the electronic token comprises a reverse obfuscation transformation for reversing obfuscation applied to the data attributes and at least one URL indicative of a location of the obfuscated data attributes;
applying a time-dependent transformation to the reverse obfuscation transformation to create an access transformation;
communicating the electronic token from the public ledger to the third-party computer;
following the at least one URL to the location of the obfuscated permissible data attributes;
sending, to the distributed public ledger from the location of the obfuscated permissible data attributes, a query to determine the validity of the URL, wherein determining the validity of the URL comprises checking whether the request was logged in the distributed public ledger;

logging information contained in the URL in the distributed public ledger; and if the URL is determined to be valid:
- selecting, at the public ledger, a further time-dependent transformation;
- communicating the further time-dependent transformation to the location of the obfuscated permissible data attribute;
- applying the further time-dependent transformation to the obfuscated permissible data attribute; and
- returning the obfuscated permissible data attribute to the third-party computer.

* * * * *